(12) United States Patent
Schouten et al.

(10) Patent No.: US 10,857,750 B2
(45) Date of Patent: Dec. 8, 2020

(54) DEVICE AND METHOD FOR CUTTING A CONTINUOUS STRIP INTO TIRE COMPONENTS

(71) Applicant: VMI Holland B.V., Epe (NL)

(72) Inventors: Aart Jan Schouten, Epe (NL); Teunis Johannes Verbruggen, Epe (NL); Gerrit Mulder, Epe (NL)

(73) Assignee: VMI HOLLAND B.V.

(*) Notice: Subject to any disclaimer, the term of this patent is extended or adjusted under 35 U.S.C. 154(b) by 0 days.

(21) Appl. No.: 16/462,462

(22) PCT Filed: Sep. 29, 2017

(86) PCT No.: PCT/NL2017/050652
§ 371 (c)(1),
(2) Date: May 20, 2019

(87) PCT Pub. No.: WO2018/093246
PCT Pub. Date: May 24, 2018

(65) Prior Publication Data
US 2019/0270266 A1 Sep. 5, 2019

(30) Foreign Application Priority Data
Nov. 18, 2016 (NL) .................................. 2017819

(51) Int. Cl.
*B29D 30/46* (2006.01)
*B26D 3/00* (2006.01)
(Continued)

(52) U.S. Cl.
CPC ............. *B29D 30/46* (2013.01); *B26D 1/085* (2013.01); *B26D 3/003* (2013.01); *B26D 3/005* (2013.01); *B26D 7/01* (2013.01)

(58) Field of Classification Search
CPC . B26D 1/08; B26D 1/06; B26D 1/085; B26D 1/065; B26D 30/46; B26D 3/003; B26D 3/005
See application file for complete search history.

(56) References Cited

U.S. PATENT DOCUMENTS 3,694,283 A * 9/1972 Cooper et al.
3,757,624 A * 9/1973 Kruse et al.
(Continued)

FOREIGN PATENT DOCUMENTS

JP 47-3036 1/1972 ............. B29H 25/07
JP 57131670 A * 8/1982
(Continued)

OTHER PUBLICATIONS

English Translation of JP57131670. (Year: 1982).*
(Continued)

*Primary Examiner* — Jennifer B Swinney
(74) *Attorney, Agent, or Firm* — Hayes Soloway P.C.

(57) ABSTRACT

Disclosed is a cutting device and a method for cutting a continuous strip into tire components. The cutting device includes a knife for cutting the continuous strip along a cutting line in a working plane and a feeding assembly with a feeding member for feeding the continuous strip in the working plane to the knife in a feeding direction that intersects with the cutting line at a cutting angle. The feeding member, and the knife are rotatable with respect to each other about a rotation axis perpendicular to the working plane for adjusting the cutting angle. The feeding assembly further includes an input member for receiving the continuous strip in an input direction into the cutting device and one or more guide members for guiding the continuous strip from the input member to the feeding member, wherein the input member is placed in line with or substantially in line with the rotation axis.

34 Claims, 13 Drawing Sheets

(51) Int. Cl.
B26D 1/08 (2006.01)
B26D 7/01 (2006.01)

(56) References Cited

U.S. PATENT DOCUMENTS

| | | | |
|---|---|---|---|
| 8,726,961 B2 | 5/2014 | Druet et al. | ............ B29D 30/42 |
| 10,493,646 B2 | 12/2019 | Van Laar et al. | ...... B26D 1/205 |
| 2004/0035521 A1* | 2/2004 | Nakakado et al. | |
| 2006/0124226 A1 | 6/2006 | Gutknecht | .................... 156/111 |
| 2012/0067516 A1 | 3/2012 | Druet et al. | .................. 156/250 |

FOREIGN PATENT DOCUMENTS

| | | | | |
|---|---|---|---|---|
| JP | 5-84851 | 4/1993 | ............ | B29D 30/46 |
| JP | 2006-511359 | 4/2006 | ............ | B29D 30/38 |
| JP | 2012-511449 | 5/2012 | ............ | B29D 30/38 |
| JP | 2018-510081 | 4/2018 | ............ | D29D 30/46 |
| WO | WO2004056558 | 7/2004 | ............ | B29D 30/42 |
| WO | WO2016020781 | 2/2016 | ............ | B29D 30/46 |
| WO | WO2016159759 | 10/2016 | ............ | B29D 30/46 |

OTHER PUBLICATIONS

Decision to Grant issued in related Japanese Patent Application Serial No. 2018-551825, dated Jan. 16, 2020, including English translation (5 pages).
Notice of Reasons for Refusal issued in related Japanese Patent Application Serial No. 2018-551825, dated Sep. 30, 2019, including English translation (4 pages).
Written Opinion issued in related Japanese Patent Application Serial No. 2018-551825, dated Dec. 26, 2019, including English translation (9 pages).
International Preliminary Report on Patentability issued in application No. PCT/NL2017/050652, dated May 21, 2019 (7 pgs).
International Search Report and Written Opinion issued in application No. PCT/NL2017/050652, dated Jan. 26, 2018 (10 pgs).

\* cited by examiner

DEVICE AND METHOD FOR CUTTING A CONTINUOUS STRIP INTO TIRE COMPONENTS

BACKGROUND

The invention relates to a cutting device and a method for cutting a continuous strip into tire components, in particular tire components for building breaker plies.

WO 2004/056558 A1 discloses a known device and method for producing a breaker ply. The device comprises an extrusion device for extruding unvulcanised rubber and cooling means with buffer loops for cooling the extruded material. The resulting continuous rubber strip is subsequently supplied to a cutting device by means of a conveyor at an angle. The conveyor as a whole can be swiveled left and right to change the angle with respect to the cutting line. As shown in FIG. 8 of WO 2004/056558 A1, the continuous strip is provided with a considerable slack between the cooling means and the cutting device to allow for the conveyor belt to swivel relative to the cooling means. The slack in the continuous strip consumes considerable space that can not be safely accessed by an operator. Moreover, the slack is subject to unpredictable jerks and jolts as the continuous strip is intermittently fed into the cutting device.

It is an object of the present invention to provide a cutting device and a method for cutting a continuous strip into tire components, wherein the feeding of the continuous strip into the cutting device can be improved.

SUMMARY OF THE INVENTION

According to a first aspect the invention provides a cutting device for cutting a continuous strip into tire components, wherein the cutting device comprises a knife for cutting the continuous strip along a cutting line in a working plane and a feeding assembly with a feeding member for feeding the continuous strip in the working plane to the knife in a feeding direction that intersects with the cutting line at a cutting angle, wherein the feeding member and the knife are rotatable with respect to each other about a rotation axis perpendicular to the working plane for adjusting the cutting angle, wherein the feeding assembly further comprises an input member for receiving the continuous strip in an input direction into the cutting device and one or more guide members for guiding the continuous strip from the input member to the feeding member, wherein the input direction is in line with or substantially in line with the rotation axis.

When the cutting angle is adjusted, the continuous strip can still be received by the input member into the cutting device in the same input direction in line with the rotation axis. Hence, the input direction of the continuous strip can become independent from the cutting angle. It is merely the first orientation of the continuous strip at the input member that changes with respect to fixed world. In particular, the part of the continuous strip upstream of the input member can be twisted about the longitudinal direction of the continuous strip, in line with the rotation axis. The orientation change is therefore only limited to the amount of twist that the continuous strip can handle about its longitudinal direction. Hence, there is no need for slacking of the continuous strip. In an embodiment thereof the input member is placed at, near or in line with the rotation axis. Said input member can thus receive the continuous strip into the cutting device at, near or in line with the rotation axis.

In a further embodiment thereof the working plane extends horizontally or substantially horizontally and/or wherein the rotation axis extends vertically or substantially vertically. Hence, slacking of the continuous strip in the insertion direction in line with the vertical rotation axis can be prevented, as gravity acts on the continuous strip in line with the longitudinal direction thereof.

In an embodiment the rotation axis intersects with the cutting line. Hence, the cutting angle can be adjusted about an axis at the cutting line.

Preferably, the feeding member is arranged for feeding the continuous strip along a feeding path in the working plane, wherein the feeding path intersects with the cutting line and the rotation axis intersects with the feeding path at the cutting line. Hence, the cutting angle can be adjusted about an axis at the cutting line at the feeding path of the continuous strip. It can therefore be ensured that the continuous strip will intersect with the rotation axis at any cutting angle.

In an embodiment the one or more guide members are arranged for directing the continuous strip along a guide path from a first orientation in line with the rotation axis at the input member to a second orientation in line with the feeding direction at the feeding member. Although the continuous strip enters the cutting device at the cutting member in a first orientation that is very different from the second orientation that is required for cutting, the guide members are able to direct the continuous strip to obtain said second orientation.

In an embodiment thereof the guide path merges tangentially with the input direction at the input member and the feeding direction at the feeding member. By feeding the continuous strip along a tangential guide path, abrupt changes in direction in the continuous strip can be prevented.

In a further embodiment the input member is rotatable about the rotation axis together with the feeding member. Preferably, the input member and the feeding member are operationally connected so as to rotate in unison about the rotation axis. Most preferably, the feeding assembly as a whole is rotatable about the rotation axis with respect to the knife.

When the strip has a substantially flat main surface, it is preferred that the input member is arranged for receiving the strip with its flat main surface parallel to the input direction and perpendicular to the feeding direction. In said orientation, the continuous strip can enter the cutting device in an orientation that requires no further twisting of the continuous strip about its longitudinal direction inside the cutting device.

In a further embodiment the input member comprises one or more input rollers, wherein each input roller is rotatable about an input roller axis that extends perpendicular to the input direction and the feeding direction. An input roller can effectively guide the continuous strip into the cutting device, in particular with its flat main surface in the orientation as claimed in the previous embodiment.

In an embodiment the feeding member comprises retaining elements for retaining the continuous strip. The retaining elements can effectively retain the continuous strip to the feeding member.

In an embodiment thereof the retaining elements are vacuum retaining elements or magnetic retaining elements. The vacuum retaining elements can be used for a continuous strip with or without reinforcement cords. The magnetic retaining elements can be used for a continuous strip with ferromagnetic or steel reinforcement cords.

In a further embodiment thereof the feeding member is positionable in a cutting position downstream of the cutting line with respect to the feeding direction for retaining a leading end of the continuous strip in said cutting position with respect to the knife. Hence, the feeding member can be used to prepare the continuous strip for cutting and/or to accurately retain the continuous strip during cutting.

In an embodiment thereof the feeding member comprises a main body and a tip that projects from the main body towards the cutting line when the feeding member is in the cutting position, wherein the main body extends in or parallel to the feeding direction and the tip deflects from the feeding direction away from the cutting line at a deflection angle. Because of the deflected tip, the feeding member can retain the continuous strip as close as possible to the cutting line, both at a sharp cutting angle and at a less sharp cutting angle. In particular, when the rotation axis is located in line with the main body of the feeding member, the tip will tend to move even more towards the cutting line when the cutting angle is increased.

In an embodiment thereof the deflection angle is in a range of five to twenty degrees, preferably in a range of seven to fifteen degrees.

In a further embodiment thereof the feeding member and the knife are rotatable with respect to each in a cutting angle range, wherein the deflection angle is chosen to be at or near the minimum angle within said cutting angle range. By choosing the deflection angle in this way, the tip can extend parallel to or substantially parallel to the cutting line at the smallest or sharpest cutting angle.

In a further embodiment thereof the retaining elements are provided in the main body and the tip. Hence, both the main body and the tip can retain the continuous strip, whereas the tip can retain the continuous strip in a position significantly closer to the cutting line than the main body. Hence, the accuracy of the positioning of the continuous strip with respect to the cutting line can be improved.

In a further embodiment thereof the feeding member is movable back-and-forth across the cutting line between the cutting position and a pick-up position upstream of cutting line with respect to the feeding direction for picking up the leading end of the continuous strip from the one or more guide members at the pick-up position and for pulling said leading end across the cutting line towards the cutting position. Hence, the continuous strip can be pulled across the cutting line by the same component that retains the continuous strip in both positions.

In another embodiment the cutting device comprises an output member for outputting the cut tire components in an output direction parallel or substantially parallel to the cutting line. By outputting the cut tire components in said output direction, a tire layer can be constructed, e.g. a body ply or a breaker ply.

In an embodiment thereof the output member comprises an output surface for supporting the cut tire components in the output direction, wherein the feeding member is arranged for transferring the cut tire components onto the output surface. Once the cut tire component is transferred from the feeding member onto the output member, the feeding member can be returned to pick-up the continuous strip for a next cutting cycle.

In an embodiment the one or more guide members are arranged for guiding the continuous strip from the input member to the feeding member in a guide plane defined by the feeding direction and the rotation axis. Hence, the continuous strip can be guided in a guide plane that is already aligned with the feeding direction.

In an embodiment thereof the one or more guide members comprises one or more guide rollers, wherein each guide roller comprises a guide roller axis extending perpendicular to the guide plane. Hence, each guide roller can rotate about said guide roller axis to advance and/or guide the continuous strip along said guide plane.

In an embodiment thereof one or more of the guide rollers are formed as brush rollers, wherein each brush roller comprises a plurality of bristles that form a circumferential brush surface around the guide roller axis for supporting the continuous strip and a side flange extending in the guide plane alongside said circumferential brush surface, wherein the bristles are inclined towards the side flange. The inclination of the bristles can bias the continuous strip against the side flange, thereby ensuring that the continuous strip is accurately aligned with respect to the guide plane.

In an embodiment a leading end of the continuous strip is held stationary at the cutting line during cutting, wherein the one or more guide members comprises a dancer roller that is movable in a dancing direction for buffering the incoming continuous strip with respect to the stationary leading end of the continuous strip during said cutting. Said dancer roller can effectively buffer a length of the continuous strip within the feeding assembly, e.g. when the continuous strip is temporarily held stationary by the feeding member at the cutting line during cutting.

According to a second aspect the invention provides a production line comprising the aforementioned cutting device, further comprising an upstream station for handling the continuous strip prior to the input of the continuous strip into the cutting device, wherein said upstream station comprises an output member that is arranged for supplying the continuous strip to the input member of the cutting device, wherein the output member of the upstream station is placed above the input member of the cutting device in line with the rotation axis of the cutting device. By placing the output member of the upstream station above the input member in the input direction, the continuous strip can be fed from the upstream station into the cutting device in line with the rotation axis. In particular when the rotation axis is placed vertically or substantially vertically, slacking of the continuous strip between the upstream station and the cutting device can be prevented with gravity acting on the continuous strip mainly or only in the longitudinal direction thereof.

In an embodiment thereof the upstream station and the cutting device cooperate for twisting the continuous strip about the rotation axis between the output member of the upstream station and the input member of the cutting device, depending on the cutting angle of the cutting device. The twist can effectively render the relative positioning of cutting station and the upstream station independent from the cutting angle.

In an embodiment thereof the placement of the upstream station with respect to the cutting device is out of line with the feeding direction of the cutting device. By placing the upstream station out of line, the production line can be designed to be more compact.

In a further embodiment the upstream station comprises a festooner for buffering a length of the continuous strip, wherein the output member of the upstream station is an output roller of the festooner.

In a further embodiment the output member of the upstream station and the input member of the cutting device are spaced apart such that the length of the continuous strip in between is less than three meters, preferably less than two meters and most preferably less than one meter. Again, the production line can be more compact.

According to a third aspect, the invention provides a method for cutting a continuous strip into tire components with the use of the aforementioned cutting device, wherein the input member is placed in line with or substantially in line with the rotation axis, wherein the method comprises the step of inputting the continuous strip into the cutting device at the input member in the input direction in line with the rotation axis. This method has the same advantages as the cutting device according to the first aspect of the invention.

In an embodiment the method further comprises the steps of guiding the continuous strip via the one or more guide members from the input member to a pick-up position below the feeding member and transferring the continuous strip from one of the guide members to the feeding member in said pick-up position, wherein the transfer comprises the steps of retaining the continuous strip to the one guide member while the feeding member is not in contact with the continuous strip, contacting the continuous strip with the feeding member, simultaneously retaining the continuous strip with the feeding member and the one guide member, releasing the continuous strip from the one guide member. This transfer is advantageous because the continuous strip is never let go during the transfer from one part of the cutting device to another. Hence, the continuous strip can be positioned more accurately with respect to the knife.

In an embodiment thereof the cutting device comprises an output member for outputting the cut tire components in an output direction parallel or substantially parallel to the cutting line, wherein the method further comprises the step of pulling the continuous strip with the feeding member in the feeding direction from the pick-up position across the cutting line into a cutting position above the output member while the feeding member retains the continuous strip, cutting the continuous strip into a tire component while the feeding member retains the continuous strip and transferring the cut tire component from the feeding member to the output member, wherein said transfer comprises the steps of retaining the continuous strip to the feeding member while the output member is not in contact with the continuous strip, providing a relative movement between the feeding member and the output member so that the output member contacts the continuous strip, simultaneously retaining the continuous strip with the feeding member and the output member and releasing the continuous strip from the feeding member. This transfer is advantageous because the continuous strip is never let go during the transfer from one part of the cutting device to another. Hence, the continuous strip can be positioned more accurately with respect to the output member.

According to a third aspect, the invention provides a method for cutting a continuous strip into tire components with the use of a cutting device, wherein the cutting device comprises a knife for cutting the continuous strip along a cutting line in a working plane and a feeding assembly with a feeding member for feeding the continuous strip in the working plane to the knife in a feeding direction that intersects with the cutting line at a cutting angle, wherein the method comprises the steps of guiding the continuous strip via the one or more guide members to a pick-up position below the feeding member and transferring the continuous strip from one of the guide members to the feeding member in said pick-up position, wherein the transfer comprises the steps of retaining the continuous strip to the one guide member while the feeding member is not in contact with the continuous strip, contacting the continuous strip with the feeding member, simultaneously retaining the continuous strip with the feeding member and the one guide member, releasing the continuous strip from the one guide member. This transfer is advantageous because the continuous strip is never let go during the transfer from one part of the cutting device to another. Hence, the continuous strip can be positioned more accurately with respect to the knife.

In an embodiment thereof the cutting device comprises an output member for outputting the cut tire components in an output direction parallel or substantially parallel to the cutting line, wherein the method further comprises the step of pulling the continuous strip with the feeding member in the feeding direction from the pick-up position across the cutting line into a cutting position above the output member while the feeding member retains the continuous strip, cutting the continuous strip into a tire component while the feeding member retains the continuous strip and transferring the cut tire component from the feeding member to the output member, wherein said transfer comprises the steps of retaining the continuous strip to the feeding member while the output member is not in contact with the continuous strip, providing a relative movement between the feeding member and the output member so that the output member contacts the continuous strip, simultaneously retaining the continuous strip with the feeding member and the output member and releasing the continuous strip from the feeding member. This transfer is advantageous because the continuous strip is never let go during the transfer from one part of the cutting device to another. Hence, the continuous strip can be positioned more accurately with respect to the output member.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 3:
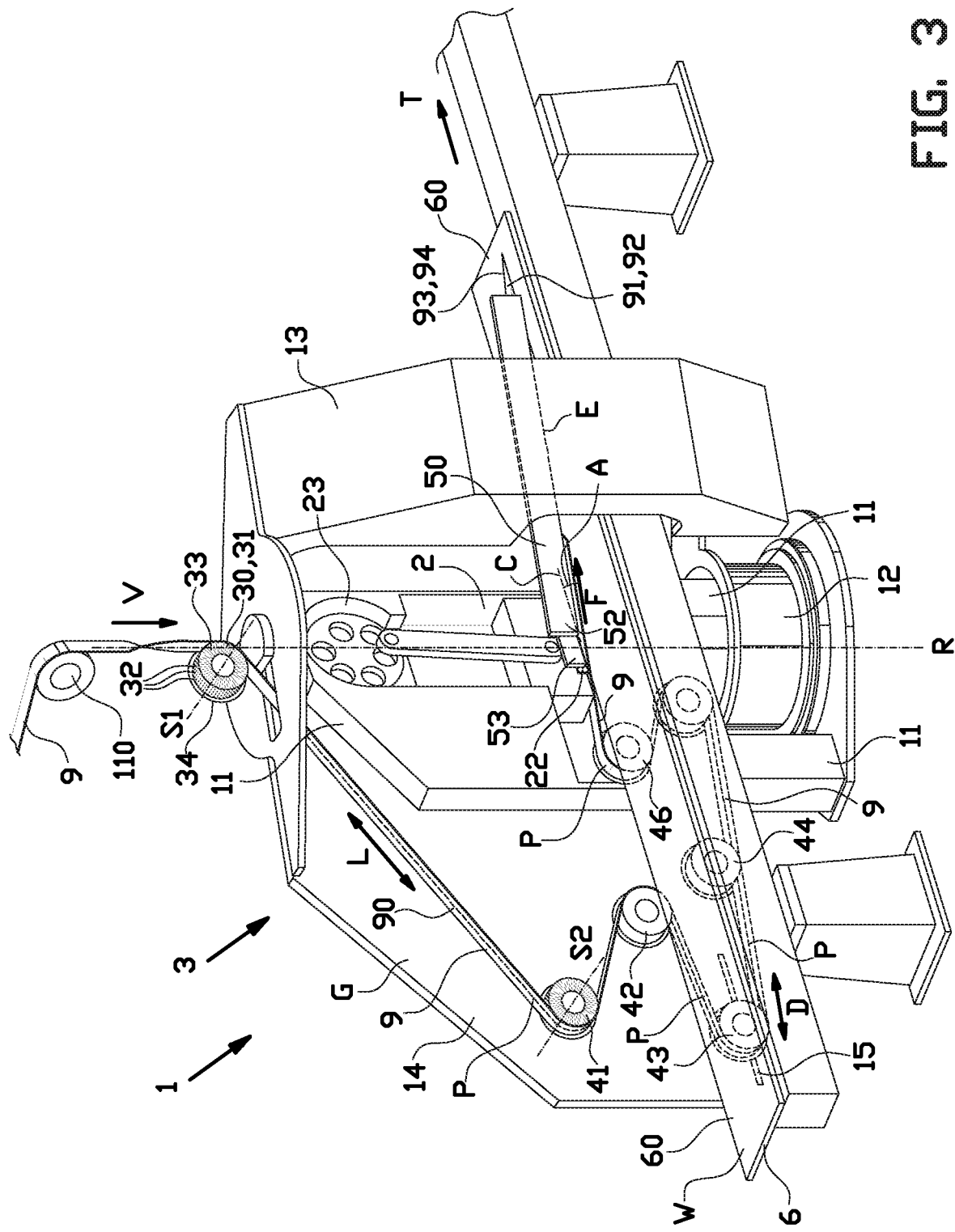
Figure 4:
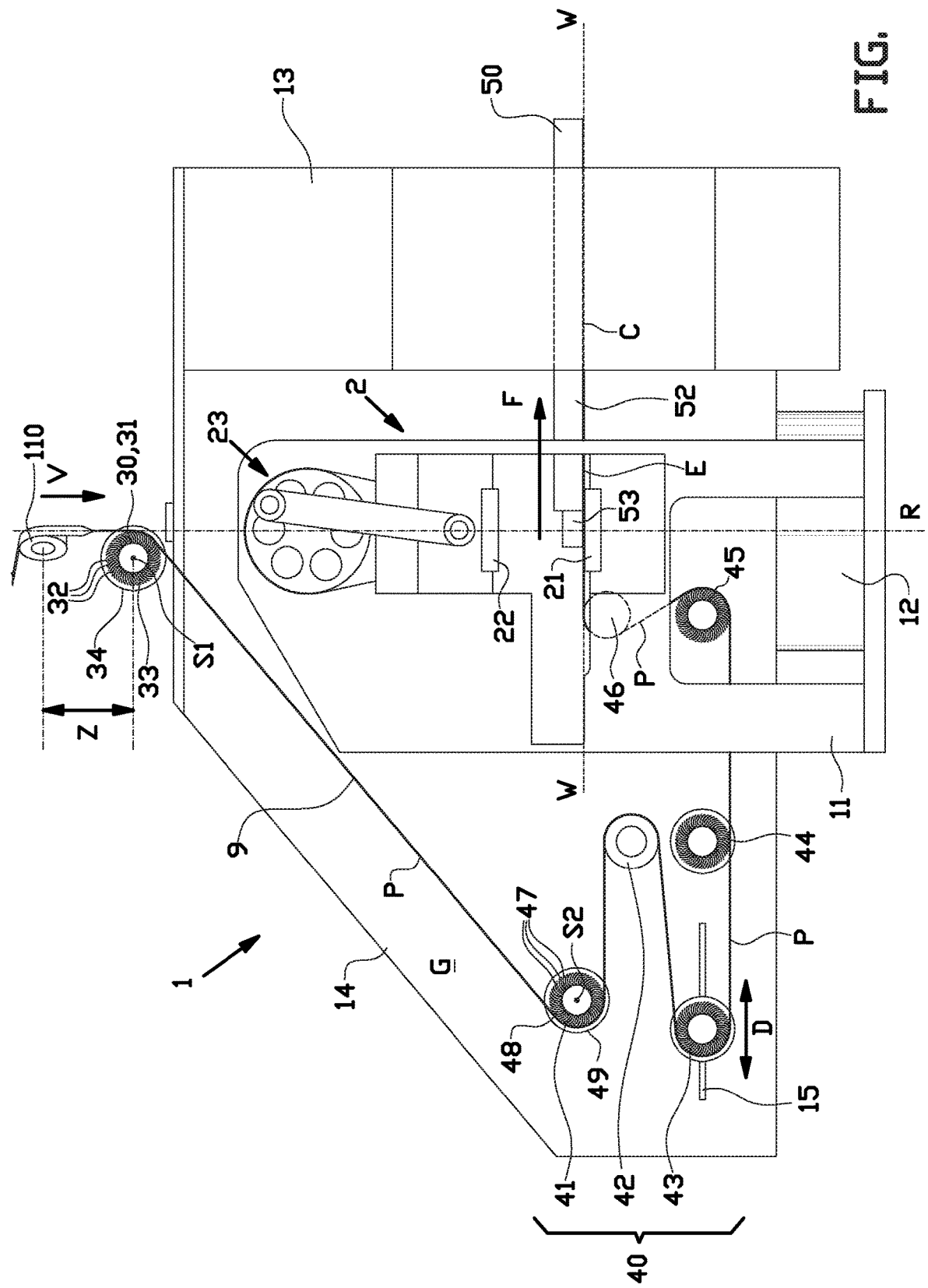
FIG. 4 shows a side view of the cutting device according to FIG. 1.
Figure 5:
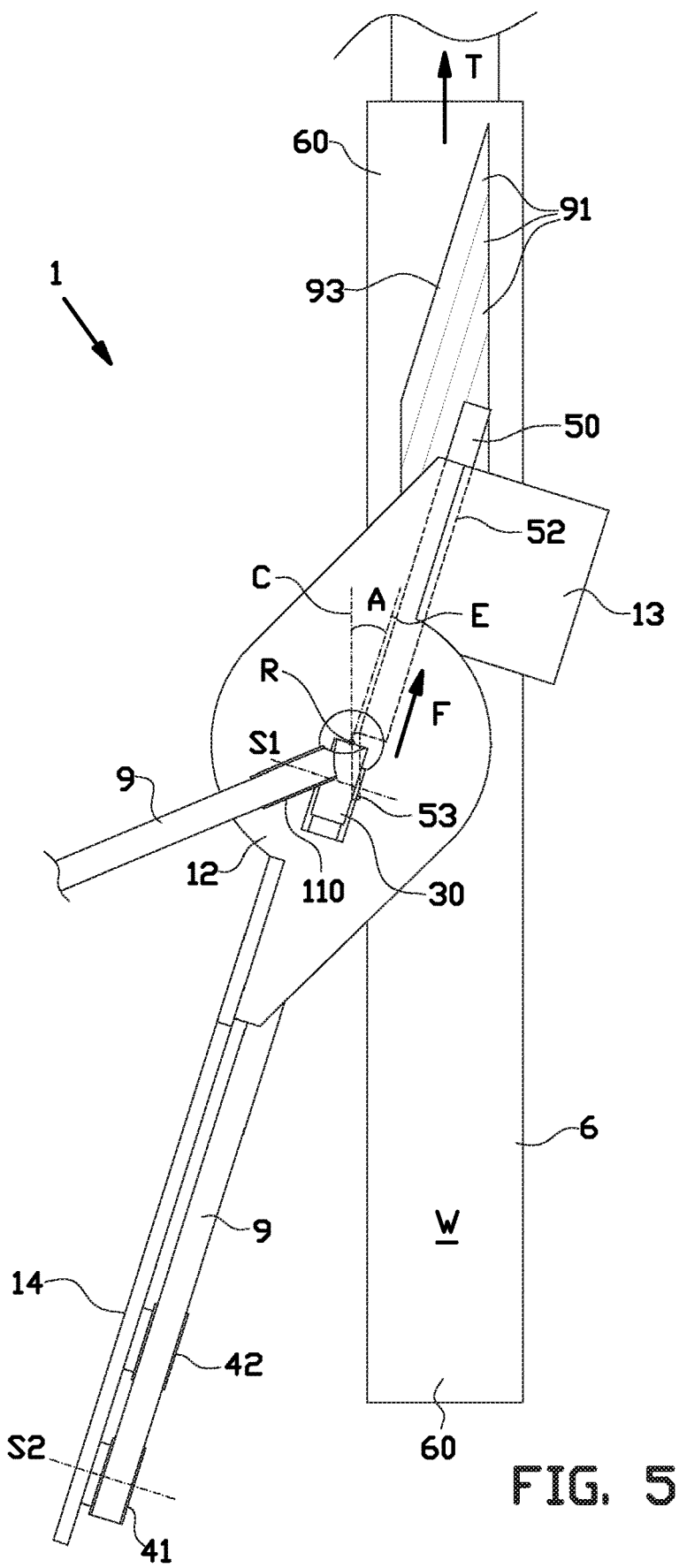
FIGS. 5 and 6 show top views of the cutting device according to FIG. 1 at different cutting angles.
Figure 6:
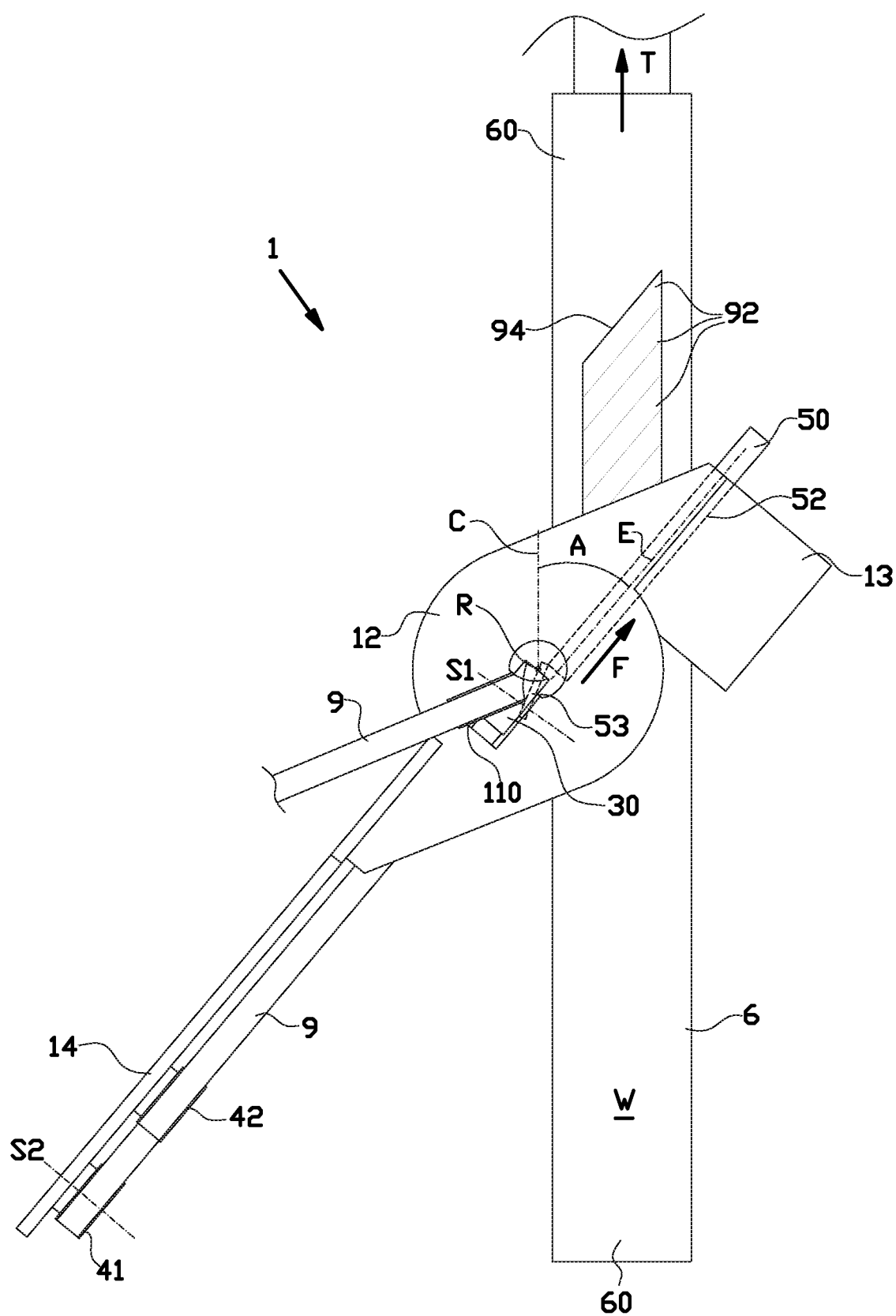

FIGS. 1-9 show a cutting device 1 according to a first embodiment of the invention for cutting a continuous strip 9 into one or more tire components. FIGS. 5 and 6 show tire components 91, 92 cut by the cutting device 1 at different cutting angles A. Said cut tire components 91, 92 are preferably used for building breaker plies 93, 94 in a manner known per se. The continuous strip 9 has a substantially flat main surface 90 extending in a longitudinal direction L of said continuous strip 9 and a plurality of reinforcement cords extending in the same longitudinal direction L.

Figure 1:
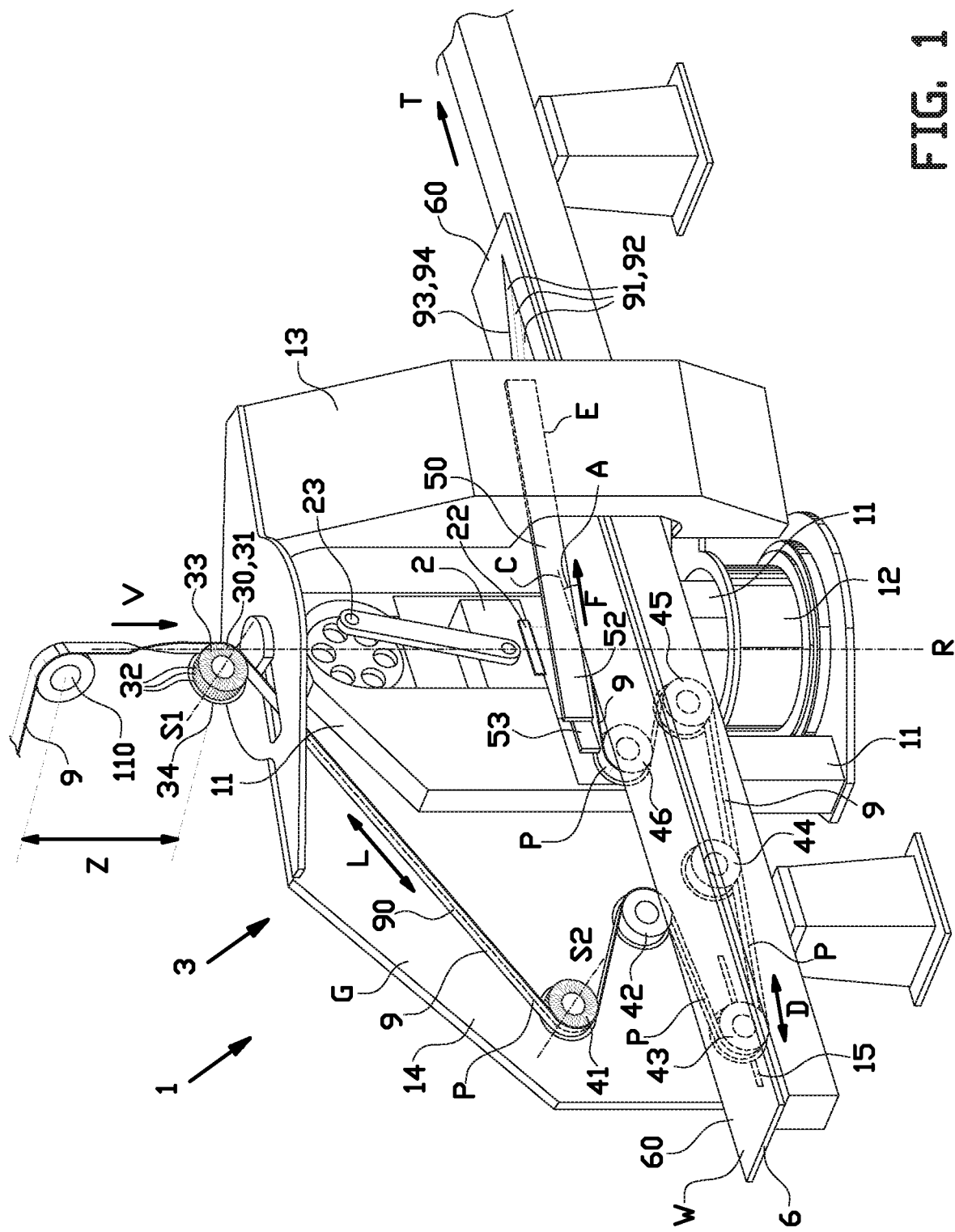
FIGS. 1, 2 and 3 show isometric views of a cutting device according to a first embodiment of the invention, during steps of a method for cutting a continuous strip into tire components.
Figure 2:
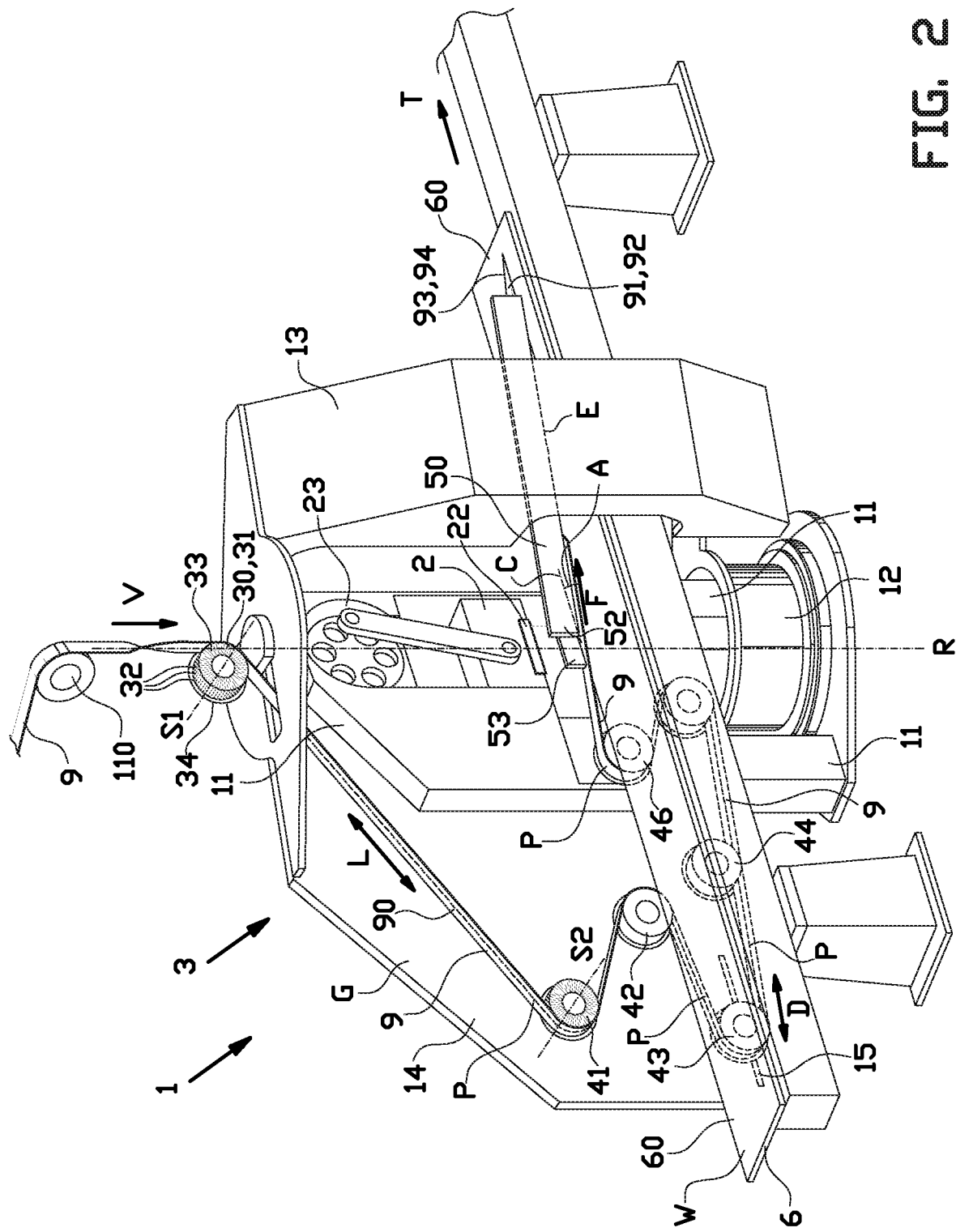

As shown in FIGS. 1, 2 and 3, the cutting device 1 comprises a knife 2 for cutting the continuous strip 9 into cut tire components 91, 92 along a cutting line C in a working plane W, a feeding assembly 3 for feeding the continuous strip 9 in the working plane W to the knife 2 in a feeding direction F that intersects with the cutting line C at a cutting angle A and an output member 6 for outputting the tire components 91, 92 in an output direction T parallel to the working plane W and/or the cutting line C.

The cutting device 1 comprises a first base 11 that is arranged to be stationary with respect to the fixed world for supporting the knife 2 with respect to the working plane W. The fixed world can be a factory floor (not shown). The cutting device 1 further comprises a second base 12 that is arranged to be rotatable with respect to the first base 11 about a rotation axis R for rotatably supporting at least a part of the feeding assembly 3 and preferably the feeding assembly 3 as a whole. The rotation axis R is perpendicular or substantially perpendicular to the working plane W. By rotating the feeding assembly 3, the feeding direction F can be adjusted relative to the cutting line C, thereby adjusting the cutting angle A. Preferably, the feeding assembly 3 is rotatable with respect to the first base 11 in a range of fifteen to fifty degrees or a smaller range, preferably eighteen to thirty five degrees or a smaller range, hence making the cutting angle A between the feeding direction F and the cutting line C adjustable within a cutting angle range with an equal range.

In this example, the second base 12 has an annular shape that is concentric to the rotation axis R, wherein the first base 11 is at least partly supported with respect to the fixed world within the annular shape of the second base 12.

The working plane W is preferably horizontal or substantially horizontal. Consequently, the rotation axis R is preferably vertical or substantially vertical.

The knife 2 can be any suitable knife for cutting tire components 91, 92 along the cutting line C. In this example, as best seen in FIG. 4, the knife 2 is a guillotine knife, known per se, having a lower knife part 21 that is placed along the cutting line C below the working plane W and an upper knife part 22 that is arranged to be driven with respect to the first base 11 in a vertical cutting motion past the lower knife part 21, thereby cutting off a length of the continuous strip 9 at the cutting line C. In this exemplary embodiment, the cutting motion of the upper knife part 22 is driven by a slider-crank transmission 23 that converts a rotary motion into a vertical motion of the upper knife part 22.

As shown in FIG. 4, the feeding assembly 3 comprises an input member 30 for receiving the continuous strip 9 into the cutting device 1 in an input direction V, a feeding member 50 for feeding the continuous strip 9 in the feeding direction A across the cutting line C in the working plane W and a plurality of guide members 40 for guiding the continuous strip 9 from the input member 30 to the feeding member 50. In this exemplary embodiment, the plurality of guide rollers 40 are arranged for directing or guiding the continuous strip 9 from the input member 30 to the feeding member 50 along a guide path P that extends in a guide plane G that is defined by the feeding direction F and the rotation axis R. Preferably, the guide path P merges tangentially with the input direction V and the feeding direction F. The second base 12 is provided with a housing or a frame 13 for holding the feeding member 50 and a plate or frame 14 extending in the guide plane G for holding the plurality of guide roller 40.

As best seen in FIGS. 1, 2 and 3, the input member 30 is arranged at or in line with the rotation axis R. In particular, the input member 30 is arranged for receiving the continuous strip 9 in the input direction V in line with or aligned with the rotation axis R. More in particular, the input member 30 is arranged for receiving the continuous strip 9 in a first orientation in which the longitudinal direction L thereof extends in line with or is aligned with the rotation axis R. Preferably, the main surface 90 of the continuous strip 9 is parallel to the input direction V and perpendicular to the feeding direction F at the input member 30. In this example, the input member 30 is formed by or comprises an input roller 31, in particular a brush roller. The input roller 31 is rotatable about an input roller axis S1 extending perpendicular to the input direction V and the feeding direction F. The input roller 31 is preferably freely rotatable. The input roller 31 comprises a plurality of bristles 32 that form a circumferential brush surface 33 of the input roller 31 and a side flange 34 extending in the guide plane G alongside said circumferential brush surface 33. The bristles 32 are inclined towards the side flange 34 for biasing the continuous strip 9 into abutment against said side flange 34, thereby aligning the continuous strip 9 with respect to the guide plane G.

Alternatively, the input member 30 may be formed by a plurality of input rollers, one or more input conveyors or by other suitable means for receiving the continuous strip 9 in line with the rotation axis R into the cutting device 1.

As best seen in FIG. 4, the plurality of guide members 40 comprises one or more guide rollers 41, 42, 43, 44, 45, 46. Each guide roller 41-46 has a guide roller axis S2 extending perpendicular to the guide plane G. In this example, some of the guide rollers 41, 43, 44, 45 are formed as brush rollers. Said guide rollers 41, 43, 44, 45 are preferably freely rotatable. Like the input roller 31, said guide rollers 41, 43, 44, 45 are provided with a plurality of bristles 47 that form a circumferential brush surface 48 and a side flange 49 extending in the guide plane G alongside said circumferential brush surface 48. The bristles 47 are inclined towards side flange 49 for biasing the continuous strip 9 into abutment against said side flange 49, thereby aligning the continuous strip 9 with respect to the guide plane G. Furthermore, in this example, some of the guide rollers 42, 46 are formed as driven rollers for controlling the feeding rate of the continuous strip 9 along the guide path P.

Preferably, the feeding assembly 3 comprises a guide rail or a slot 15 for receiving one of the guide rollers 43. Said one guide roller 43 can acts as a dancer roller by sliding along said guide rail or slot 15 in a dancing direction D. Said dancer roller 43 can effectively buffer a length of the continuous strip 9 within the feeding assembly 3.

As best seen in FIG. 4, the last guide member 46 of the plurality of guide members 40 is positioned in a pick-up position at or near the working plane W for directing, guiding or feeding the continuous strip 9 in a second orientation in line with the feeding direction F to the feeding member 50. In the second orientation, the longitudinal direction L of the continuous strip 9 extends in line with or is aligned with the feeding direction F. Preferably, the main surface 90 of the continuous strip 9 is parallel or substantially parallel to the working plane W in said second orientation.

Figure 9:
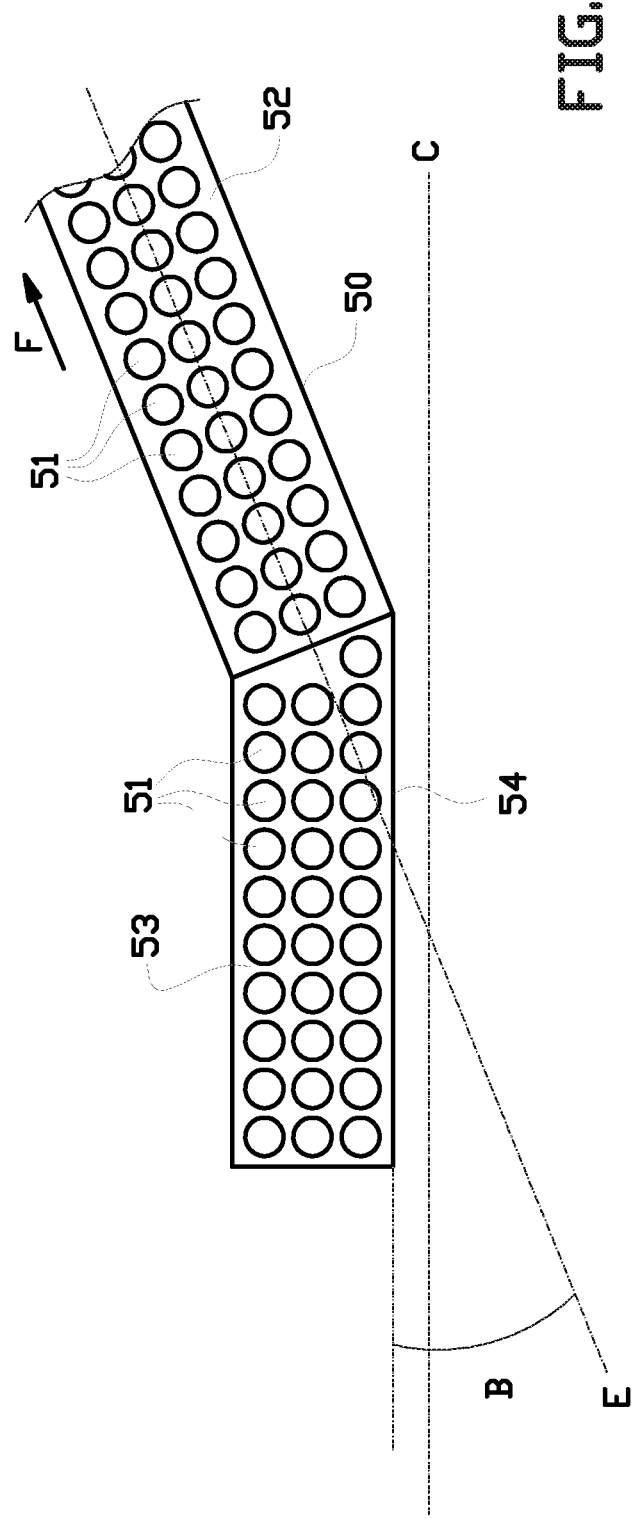
FIG. 9 shows a bottom view of a detail of the cutting device according to FIGS. 7 and 8.

As shown in FIGS. 1 and 2, the feeding member is movable back-and-forth across the cutting line C along a feeding path E between the pick-up position upstream of cutting line C and a cutting position downstream of the cutting line C, respectively, with respect to the feeding direction F. In the pick-up position, the feeding member 50 is arranged for picking up a leading end of the continuous strip 9 from the last guide member 40 at said pick-up position. As shown in FIG. 9, the feeding member 50 is provided with suitable retaining elements 51, e.g. magnets or vacuum retaining elements, for the purpose of picking up and retaining the continuous strip 9 to the feeding member 50. The feeding member 50 is subsequently moved along the feeding path E in the feeding direction F across the cutting line C, thereby pulling said leading end of the continuous strip 9 across the cutting line C towards the cutting position. The feeding member 50 is arranged for retaining the continuous strip 9 in the cutting position with respect to the knife 2 during the cutting, so that the cutting can be performed accurately.

Figure 7:
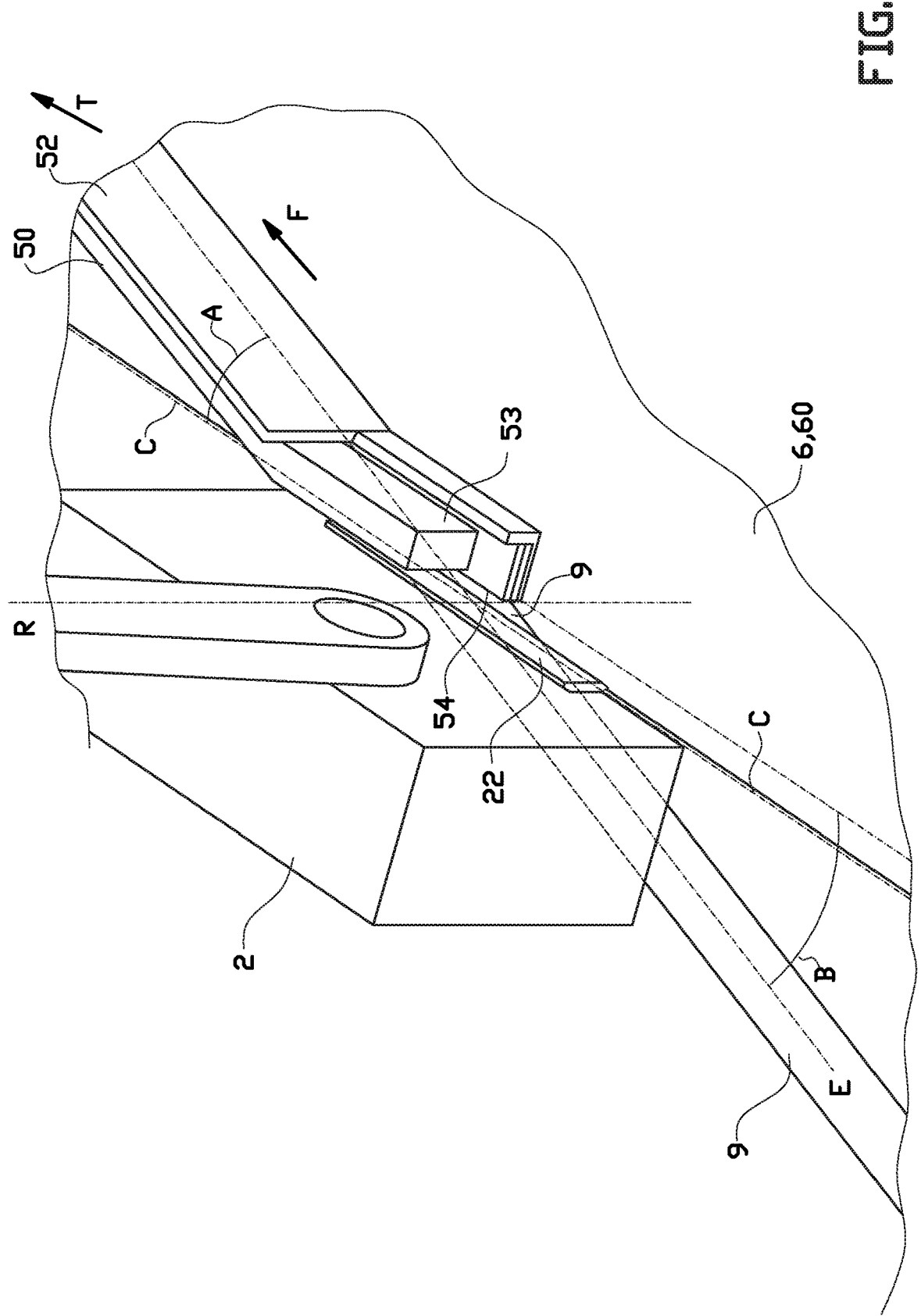
FIGS. 7 and 8 show isometric views of a detail of the cutting device according to FIG. 1 at different cutting angles.
Figure 8:
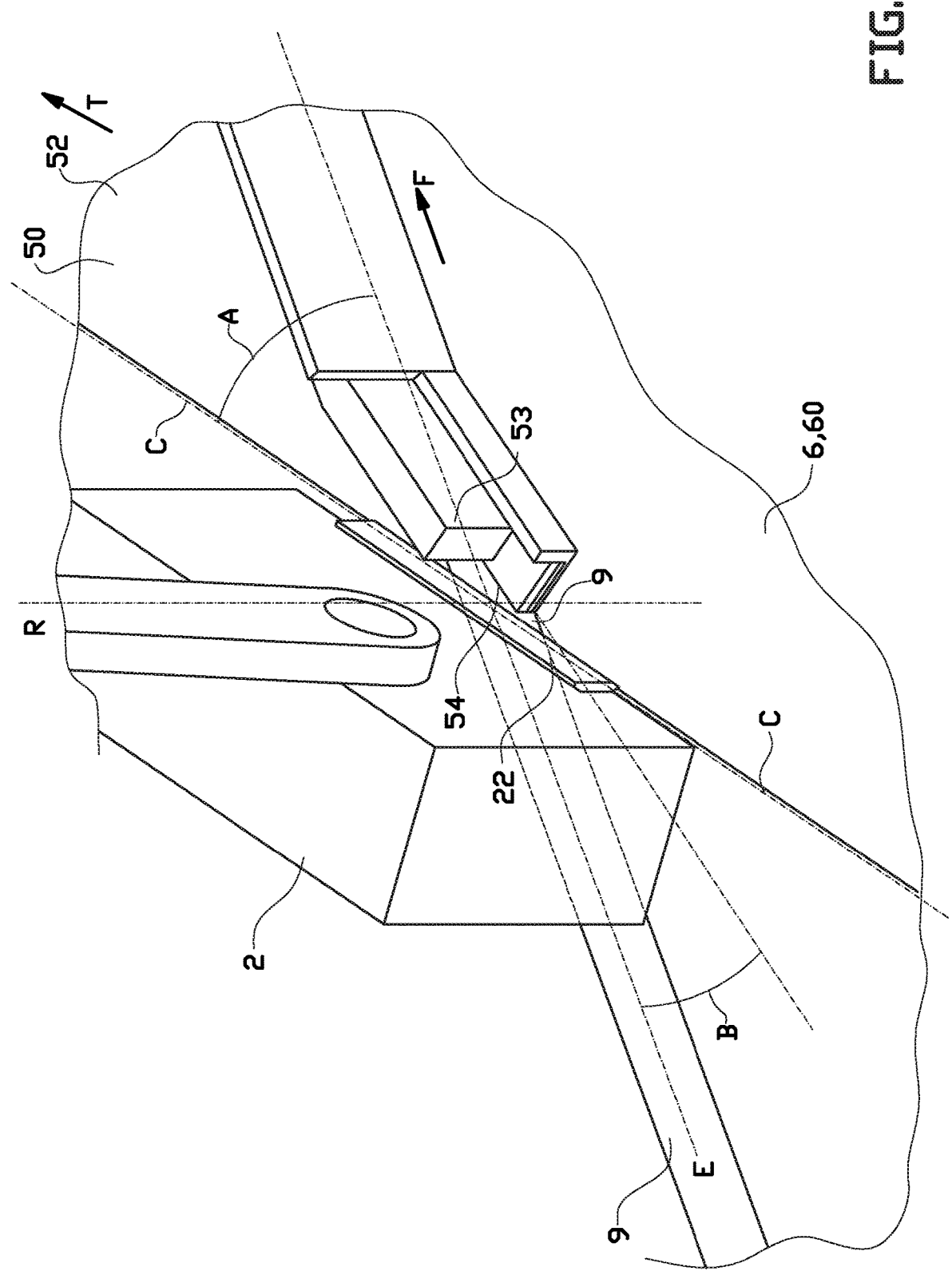

To increase the accuracy of the cutting, the feeding member 50 comprises a main body 52 and a tip 53 that projects from the main body 52 towards the cutting line C when the feeding member 50 is in the cutting position of FIG. 2. While the main body 52 extends in or parallel to the feeding direction F, the tip 53 deflects from the feeding direction F away from the cutting line C at a deflection angle B. The deflection angle B is chosen in a range of twelve to twenty degrees and more preferably in a range of fifteen to eighteen degrees. Most preferably the deflection angle B is chosen to be at or near the minimum angle within said cutting angle range. By choosing the deflection angle B in this manner, the tip 53 will extend parallel to or substantially parallel to the cutting line C at the smallest or sharpest cutting angle A, as shown in FIG. 7. Because of the deflected tip 53, the feeding member 50 can retain the continuous strip 9 as close as possible to the cutting line C, regardless of the cutting angle A of the feeding member 50 with respect to said cutting line C.

In an alternative embodiment, not shown, the tip 53 may be hingeably connected to the main body 52 so as to be rotatable with respect to said main body 52 to adjust the deflection angle B. This allows for adapting the tip 53 to different cutting angle ranges.

In this particular example, the main body 52 extends along the feeding path E that intersects with the rotation axis R, while the tip 53 is offset with said feeding path E over the deflection angle B. Hence, a rotation of the feeding member 50 about the rotation axis R will actually cause a movement of the tip 53 towards and/or close to the cutting line C, thereby improving the ability of the feeding member 50 to retain the continuous strip 9 as close as possible to the cutting line C. It can be observed in FIG. 7 that when the feeding direction F is at a very sharp cutting angle A with respect to the cutting line C, the tip 53 can be positioned parallel to or substantially parallel to the cutting line C, at a small distance from the cutting line C. When the cutting angle A is increased, as in FIG. 8, the main body 52 is moved away from the cutting line C while the tip 53 moves closer to the cutting line C.

It is submitted that the shape of the tip 53 does not necessarily need to be rectangular. The tip 53 may alternatively be formed by any tip body that presents a leading tip surface 54 that is deflected away from the cutting line C under the deflection angle B so that it does not interfere with the cutting line C within the cutting angle range. Said tip body may be of tapered, triangular or any other suitable shape that meets the requirements above.

As shown in the bottom view of FIG. 9, the retaining elements 51 are provided in the main body 52, as well as the tip 53. Preferably, the retaining elements 51 are provided as close as possible to the distal end of the tip 53 and thus as close as possible to the cutting line C. Hence, it is advantageous to make the retaining elements 51 as close as possible without compromising on their functionality.

As best seen in FIGS. 1, 5 and 6, the output member 6 comprises a output surface 60 for receiving the cut tire components 91, 92 from the feeding member 50. The output surface 60 is arranged to be advanced intermittently in the output direction T over an index distance that roughly equals the dimension of one of said tire components 91, 92 in the output direction T. Hence, the tire components 91, 92 can be placed side-by-side in said output direction T on the output surface 60. The output member 6 can for example be a conveyor belt or a movable table that is arranged to be advanced in the output direction T. Once on the output surface 60, the tire components 91, 92 can be spliced to form one or more breaker plies 93, 94.

A method for cutting the continuous strip 9 into tire components 91, 92 with the use of the aforementioned cutting device 1 will now be elucidated with reference to FIGS. 1-9.

FIG. 1 shows the situation in which the knife 2 is at least partially moved away from the cutting line C to allow passage of the feeding member 50 across the cutting line C in the feeding direction F. In particular, the upper knife part 22 is lifted into a position spaced apart from the lower knife part 21 at the cutting line C, so that the feeding member 50 can be moved in the feeding direction F across the cutting line C over the lower knife part 21. The feeding member 50 is retracted with respect to the feeding direction F into the pick-up position directly above the last guide member 46 of the plurality of guide members 40. The continuous strip 9 is fed into the cutting device 1 in the insertion direction V in line with the rotation axis R and subsequently guided by the plurality of guide members 40 towards the pick-up position at the feeding member 50. The leading end of the continuous strip 9 is now resting on one or more of the guide members 40 at the pick-up position and is ready to be picked-up by the feeding member 50.

FIG. 2 shows the situation in which the feeding member 50 has picked-up the leading end of the continuous strip 9 and has pulled said leading end past the cutting line C into the cutting position. The tip 53 of the feeding member 50 is located as close as possible to the cutting line C, so that the continuous strip 9 can be accurately retained near said cutting line C. The leading end of the continuous strip 9 is now ready to be cut-off by the knife along the cutting line C to form one of the tire components 91, 92.

FIG. 3 shows the situation in which the upper knife part 22 has been moved downwards in a vertical cutting motion past the lower knife part 21 to cut-off the leading end of the continuous strip 9 along the cutting line C. A tire component 91, 92 is created which may subsequently be transferred from the feeding member 50 to the output member 6. Once on the output surface 60 of the output member 6, a breaker ply 93, 94 may be formed in accordance with the steps that were discussed earlier in this description.

When the feeding assembly 3 is rotated about the rotation axis R to adjust the cutting angle A between the feeding direction F and the cutting line C, the input member 30 stays in the same position in line with the rotation axis R. It is merely the first orientation of the continuous strip 9 at the input member 30 that changes with respect to fixed world as the cutting angle A is adjusted. Hence, there is no need for slacking the continuous strip 9. The change in orientation is absorbed by the part of the continuous strip 9 upstream of the input member 30. Said part will be twisted about the longitudinal direction L of the continuous strip 9. The orientation change is therefore only limited to the amount of twist that the continuous strip 9 can handle. When the continuous strip 9 is fed into the cutting device 1 from an upstream station that is located vertically above the input member 30, the continuous strip 9 can be made to extend vertically or substantially vertically between the upstream station and the input member 30. Hence, the twist can occur about the rotation axis R. Moreover, the continuous strip 9 will not be subjected to any slacking, as gravity acts on the continuous strip 9 in line with the longitudinal direction L thereof.

Figure 10:
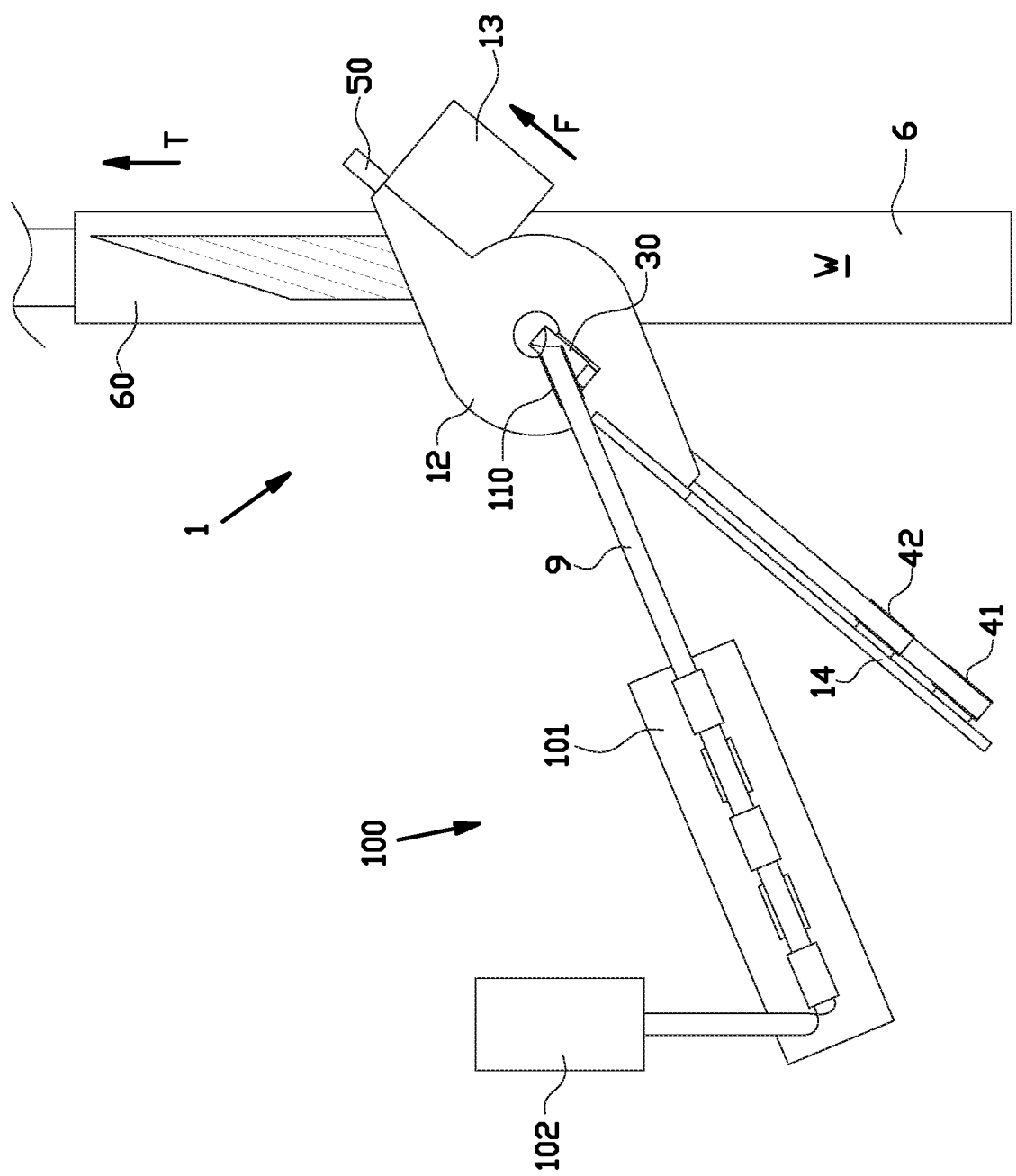
FIG. 10 shows a production line comprising the cutting device, a festooner and an extruder.

FIG. 10 shows a top view or plan view of a production line 100 that—in addition to the aforementioned cutting device 1—comprises an upstream station 101 for handling the continuous strip 9 prior to the input of the continuous strip 9 into the cutting device 1 and extruder 102 for extruding the continuous strip 9 and supplying said freshly extruded continuous strip 9 to the upstream station 101. Naturally, there can be one or more additional stations in between the extruder 102 and the cutting device 1. The upstream station 101 may be a festooner for cooling and/or buffering the continuous strip 9. The upstream station 101 has an output member 110 that is arranged for supplying the continuous strip 9 to the input member 30 of the cutting device 1. Said output member 110 is also schematically shown in FIGS. 1-4. In this exemplary embodiment, the output member 110 of the upstream station 101 is an output roller.

As demonstrated with the aforementioned method, the continuous strip 9 can be fed into the cutting device 1 in the insertion direction V in line with the rotation axis R, thereby allowing for a twist of the continuous strip 9 about said rotation axis R between the upstream station 101 and the cutting device 1. Preferably, the output member 110 of the upstream station 101 is located vertically above the input member 30 of the cutting device 1, such that the continuous strip 9 can extend vertically or substantially vertically between the upstream station 101 and the cutting device 1. In FIGS. 1-4, the distance Z between the output member 110 of the upstream station 101 and the input member of the cutting device 1 is schematically shown. In practice, the distance Z is chosen such that the length of the continuous strip 9 between the upstream station 101 and the cutting device 1 is less than three meters, preferably less than two meters and most preferably less than one meter. Preferably, the output member 110 of the upstream station 101 and the input member 30 of the cutting device 1 are spaced apart such that the length of the continuous strip 9 is sufficient to facilitate the twist.

As shown in the plan view of FIG. 10, the twisting of the continuous strip 9 about the rotation axis R allows for the upstream station 101 to be placed at any angle out of line with respect to the feeding direction F, e.g. an angle that is optimal to keep the production line 100 compact. Similarly, when the transfer of the continuous strip 9 from the extruder 102 to the upstream station 101 is performed in a vertical direction, the extruder 102 can even be placed out of line with the upstream station 101. FIGS. 11A-11H schematically show in more detail the steps of transferring the continuous strip 9 from the guide members 40 to the feeding member 50, pulling the continuous strip 9 across the cutting line C for cutting and transferring the continuous strip 9 from the feeding member 50 onto the output surface 60 of the output member 6. These steps are independent of how the continuous strip 9 enters the cutting device 1 at the input member 30. Hence, these steps can be performed as an individual method, following a insertion of the continuous strip 9 into the cutting device 1 according to FIGS. 1-9, in line with the rotation axis R, or following a conventional insertion of the continuous strip 9 into an alternative cutting device, e.g. in a horizontal plane as in WO 2004/056558 A1. Hence, the cutting device 1 of FIGS. 11A-11H is provided with both reference sign 1 and reference sign 201 as it can be applied in the cutting device 1 of FIGS. 1-9 and as an individual cutting device 201, as if it were a second embodiment of the invention.

As shown in FIGS. 11A-11H, the cutting device 1, 201 according to the second embodiment of the invention comprises a plurality of guide members 40, 240 for guiding the continuous strip 9 to the pick-up position at the working plane W, a feeding member 50, 250 for picking-up the continuous strip 9 at the pick-up position and for pulling said continuous strip 9 across the cutting line C into the cutting position, a knife 2, 202 with a lower knife part 21, 221 and an upper knife part 22, 222 for cutting the continuous strip 9 along the cutting line C and an output member 6, 206 for receiving the cut tire components 91, 92 from the feeding member 50, 250.

The steps of the method according to FIGS. 11A-11H are special because the continuous strip 9 is never let go during the transfer from one part of the cutting device 1, 201 to another. Hence, the continuous strip 9 can be positioned more accurately with respect to the knife 2, 202 and ultimately the output member 6, 206.

Figure 11A:
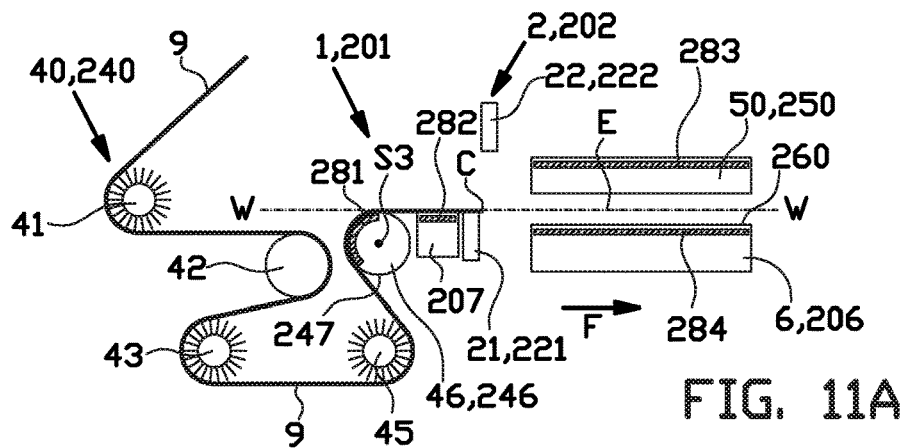
FIGS. 11A-11H show side views of various parts of the cutting device of FIG. 1 cooperating in a second method to cut a continuous strip into tire components, which method can be applied in combination with or separately from the main method.

As shown in FIG. 11A, the continuous strip 9 is fed by the last guide member 46, 246, hereinafter referred to as the infeed member 46, 246, upstream of the cutting line C towards the pick-up position in the working plane W. In this exemplary embodiment, the infeed member 46, 246 is an infeed roller, preferably a driven infeed roller. As the infeed roller 46, 246 has a circumferential surface that is not suitable for supporting the continuous strip 9 in close proximity to the cutting line C, a gap remains between the infeed roller 46, 246 and the cutting line C. Preferably, the cutting device 1, 201 is further provided with a strip support 207 between the driven roller 46, 246 and the cutting line C to support the continuous strip 9 in the gap between the infeed roller 46, 246 and the cutting line C. The infeed member 46, 246 and the strip support 207 (if applicable) are provided with retaining elements 281, 282 for retaining the continuous strip 9 at the pick-up position.

Figure 11B:
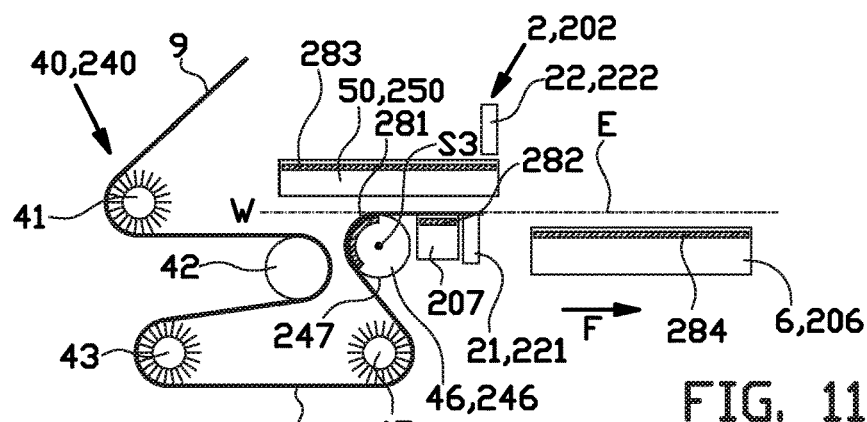
Figure 11C:
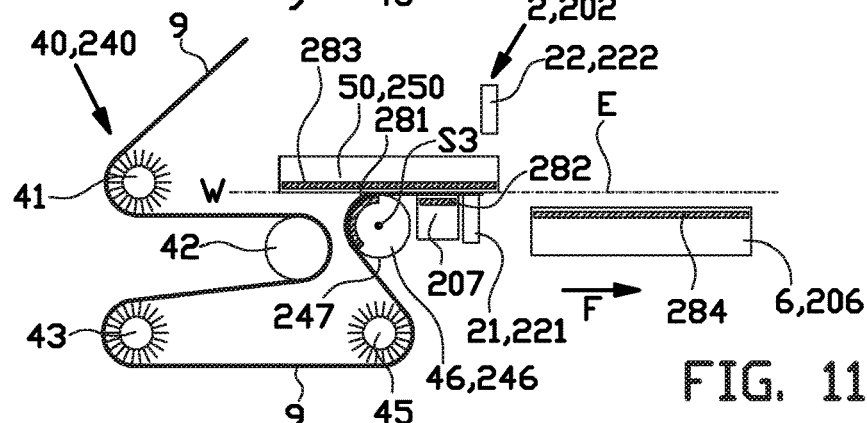

FIG. 11B shows the situation in which the feeding member 50, 250 is retracted with respect to the feeding direction F to the pick-up position. The feeding member 50, 250 is now located vertically above, yet spaced apart from the continuous strip 9 in the pick-up position. FIG. 11C shows the situation in which the feeding member 50, 250 is subsequently moved down into contact with the continuous strip 9. The feeding member 50, 250, the infeed member 46, 246 and the strip support 207 (if applicable) are now all in contact with the continuous strip 9 in the pick-up position. The feeding member 50, 250 is also provided with retaining elements 283, for example the retaining elements 51 as shown in FIG. 9. The retaining element 283 of the feeding member 50, 250 above the pick-up position and at least one of the retaining elements 281, 282 of the infeed member 46, 246 or the strip support 207 (if applicable) below the pick-up position are arranged for simultaneously retaining the continuous strip 9 in the pick-up position. Hence, the continuous strip 9 is not let go by the retaining elements 281, 282 of the infeed member 46, 246 and the strip support 207 (if applicable) prior to the retaining of the continuous strip 9 by the retaining elements 283 of the feeding member 50, 250.

Figure 11D:
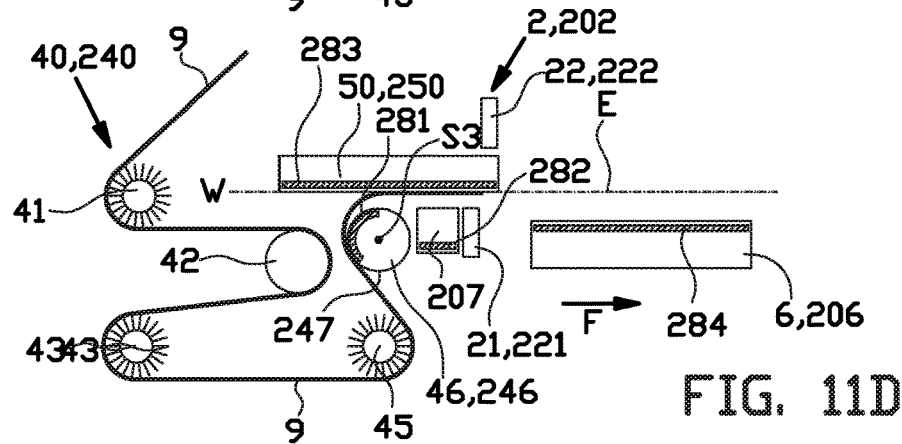

FIG. 11D shows the situation in which the retaining elements 281, 282 of the infeed member 46, 246 and the strip support 207 (if applicable) have at least partially released the continuous strip 9. This partial release can be achieved by separating at least one of the retaining elements 281, 282 from the continuous strip 9, i.e. by creating a separation distance between the retaining elements 281, 282 and the continuous strip 9 or by reducing or deactivating the retaining ability of at least one of the retaining elements 281, 282. Once the retaining ability of the retaining element 283 at the feeding member 50, 250 exceeds the retaining ability of the retaining elements 281, 282 at the infeed member 46, 246 and/or the strip support 207 (if applicable), the continuous strip 9 can be lifted from the pick-up position by the feeding member 50, 250. The continuous strip 9 is now transferred to and retained by the feeding member 50, 250.

In this exemplary embodiment, the infeed member 46, 246 is an infeed roller with a circumferential surface 247 that is rotatable about an infeed roller axis S3, wherein the retaining element 281 is positioned at a fixed angular position on the inside of the circumferential surface 247 for attracting the continuous strip 9 to said circumferential surface 247 at said fixed angular position. The retaining element 281 may for instance be a magnetic retaining element 281 that is fixedly mounted to a shaft (not shown) at the infeed roller axis S3 inside the infeed roller 246. The circumferential surface 247 may be arranged in a rotatable manner on said same shaft. Preferably, the retaining element 281 ends short of the top or north angular position of the infeed roller 246, in particular at three to ten degrees from said top or north angular position, so that the continuous strip 9 may be more easily lifted from said top of the infeed roller 246. By providing the rotatable circumferential surface 247 around the fixed retaining element 281, the infeed roller 246 can feed the continuous strip 9 into the working plane W in the feeding direction F by contacting the continuous strip 9 along only a portion of its circumferential surface 247, thereby reducing friction which could cause the continuous strip 9 to run off the infeed roller 246.

As shown in FIG. 11D, the feeding member 50, 250 is arranged for at least partially lifting the continuous strip 9 from the strip support 207 (if applicable) and the infeed member 46, 246 into a position above and/or spaced apart from the working plane W. A corresponding length of the continuous strip 9 is fed by the plurality of guide members 40, 240 towards the feeding member 50, 250 to allow for said partial lifting. The additional length of the continuous strip 9 may form a small slack in the continuous strip 9 between the infeed member 46, 246 and the feeding member 50, 250.

In this particular example, featuring the infeed roller 246, the continuous strip 9 is now at least partially spaced apart from the circumferential surface 247 of the infeed roller 246 at the angular position of the retaining element 281. Hence, the magnetic attraction between the retaining element 281 and the continuous strip 9 is reduced and the feeding member 50, 250 is able to pull the continuous strip 9 across the cutting line C. Meanwhile, the reduced magnetic attraction between the retaining element 281 in the infeed roller 246 and the continuous strip 9 remains sufficient to retain the continuous strip 9 to the circumferential surface 247 of the infeed roller 246 during the pulling of the feeding member 50, 250.

Figure 11E:
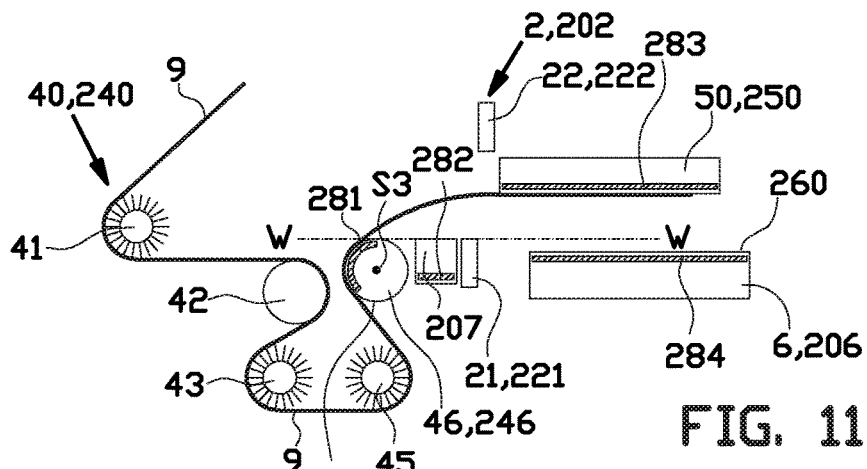

FIG. 11E shows the situation in which the feeding member 50, 250 is moved in the feeding direction F across the cutting line C into a position above the output member 6, 206, thereby pulling the continuous strip 9 across the cutting line C. The plurality of guide members 40, 240 have fed an additional length of the continuous strip 9 to the feeding member 50, 250 to allow for said movement of the feeding member 50, 250 in the feeding direction F. The additional length of the continuous strip 9 may form a slight slack in the continuous strip 9 between the infeed member 46, 246 and the feeding member 50, 250.

Figure 11F:
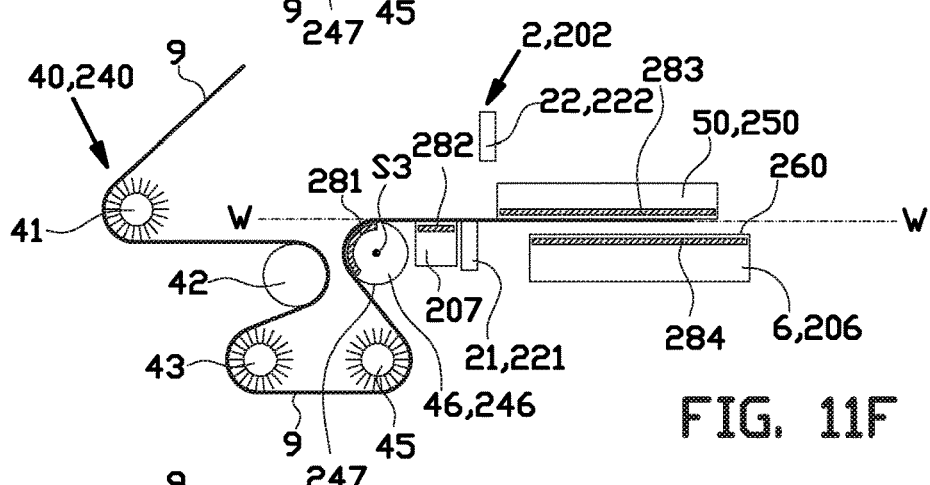

FIG. 11F shows the situation in which the feeding member 50, 250 is moved downwards towards the working plane W until the continuous strip 9 extends in the working plane W. The continuous strip 9 is now retained by the retaining element 283 in the feeding member 50, 250 downstream of the cutting line C and by the retaining element 281 in the infeed member 46, 246 upstream of the cutting line C. Optionally, the retaining element 282 in the strip support 207 (if applicable) may again be moved into its active position to retain the continuous strip 9 closely upstream of the cutting line C. The continuous strip 9 is now ready to be cut by the knife 2, 202. In FIG. 11F, the output surface 60, 260 of the output member 6, 206 is positioned below the working plane W at a distance spaced apart from the working plane W. Hence, the continuous strip 9 in the working plane W is not yet supported by the output member 6, 206.

Figure 11G:
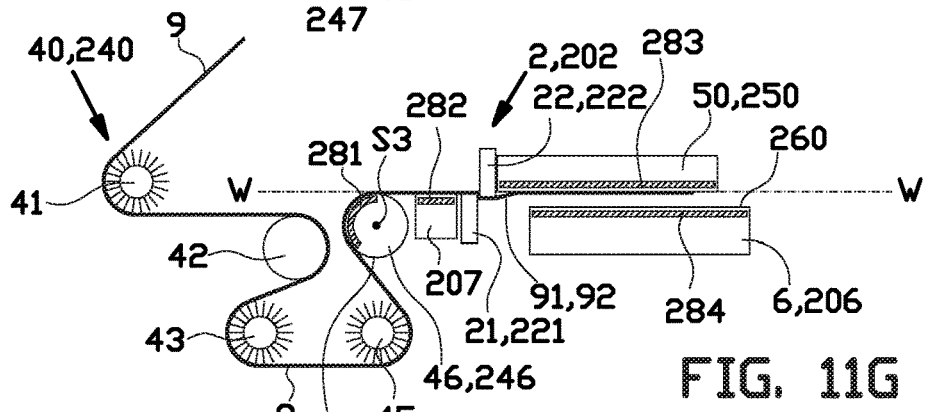

FIG. 11G shows the situation in which the upper knife part 22, 222 has been moved in a downward cutting direction along the lower knife part 21, 221 to cut the continuous strip 9 at the cutting line C. The part of the continuous strip 9 downstream of the knife 2, 202 now forms a tire component 91, 92, which is continued to be held by the retaining element 283 in the feeding member 50, 250. The continuous strip 9 upstream of the cutting line C continuous to be retained by the retaining element 283 in the infeed member 46, 246. The retaining member 282 in the strip support 207 (if applicable) may be reactivated to arrive at the situation of FIG. 11A. The continuous strip 9 is thus ready to be entered into the cutting device 1, 201 during a next cycle of the method once the previous cycle of the method has been completed.

Figure 11H:
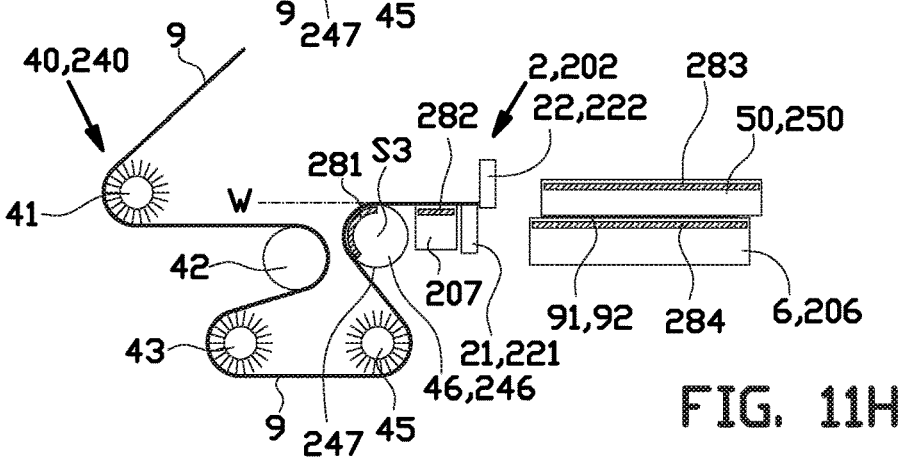

FIG. 11H shows the situation in which a relative movement between the feeding member 50, 250 and the output member 6, 206 towards each other is provided, either by moving the feeding member 50, 250 downwards towards the output surface 60, 260 of the output member 6, 206 or by moving the output member 6, 206 upwards towards the feeding member 50, 250. The output member 6, 206 is provided with a retaining element 284 at or near its output surface 60, 260 for retaining the tire component 91, 92. The feeding member 50, 250 and the output member 6, 206 are moved towards each other until both are in contact with the tire component 91, 92. Hence, the tire component 91, 92 is retained simultaneously by the retaining element 283 in the feeding member 50, 250 and the retaining element 284 in the output member 6, 206. Subsequently, the tire component 91, is released from the retaining element 283 of the feeding member 50, 250. This release can be achieved by separating the retaining element 283 of the feeding member 50, 250 from the tire component 91, 92, i.e. by creating a separation distance between the retaining elements 283 and the tire component 91, 92 or by reducing or deactivating the retaining ability of the retaining element 283. The tire component 91, 92 is now transferred from the feeding member 50, 250 onto the output member 6, 206.

The steps of the method above allow for the continuous strip 9, and subsequently the obtained tire component 91, 92 to be transferred between the various components of the cutting device 1, 201 without ever letting go of the continuous strip 9 or the obtained tire component 91, 92. Hence, the position of the continuous strip 9 and the tire component 91, 92 thus obtained can be significantly more accurate throughout the cutting device 1, 201.

The retaining elements 281-284 are preferably of the group comprising vacuum retaining elements or magnetic retaining elements.

Figure 12:
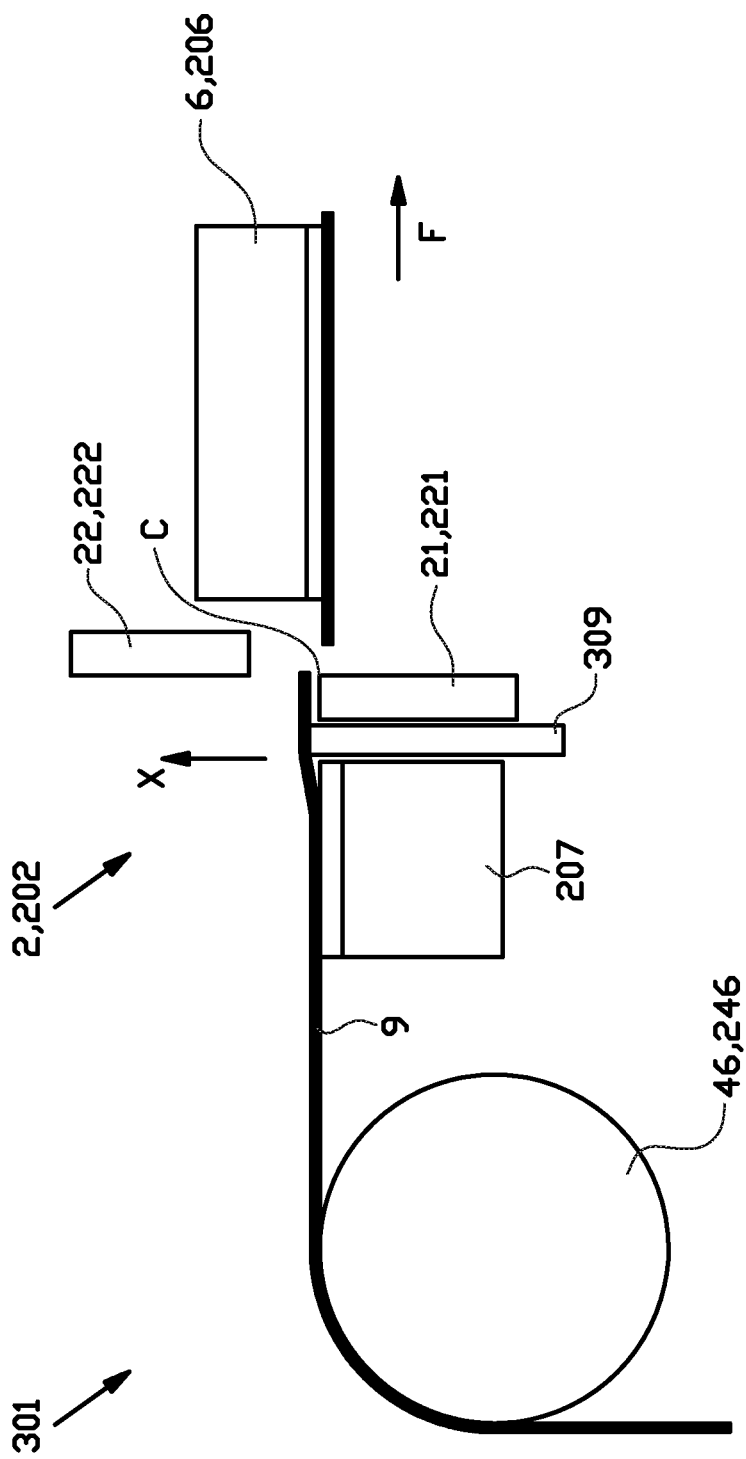
FIG. 12 shows a side view of an alternative cutting device according to a further embodiment of the invention.

FIG. 12 shows an alternative cutting device 301 according to a further embodiment of the invention, which differs from the aforementioned cutting devices 1, 201 in that a release pusher 309 is provided between the strip support 207 and the lower knife part 21, 221 to make sure that the leading end of the continuous strip 9 that is created when cutting the continuous strip 9 at the cutting line C does not stick to the lower knife part 21, 221 when a subsequent length of the continuous strip 9 is fed into the cutting device 1. When the leading end remains stuck, the subsequent length of the continuous strip 9 may curl up at the cutting line C instead of moving beyond the cutting line C. The release pusher 309 is movable in an upward pushing direction X transverse or perpendicular to the feeding direction F alongside the lower knife part 21, 221 to lift the freshly created leading end at the cutting line C from the lower knife part 21, 221 in said pushing direction X to release the continuous strip 9 from the lower knife part 21, 221.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A cutting device for cutting a continuous strip into tire components, wherein the cutting device comprises a knife for cutting the continuous strip along a cutting line in a working plane and a feeding assembly with a feeding member for feeding the continuous strip in the working plane to the knife in a feeding direction that intersects with the cutting line at a cutting angle, wherein the feeding member and the knife are rotatable with respect to each other about a rotation axis perpendicular to the working plane for adjusting the cutting angle, wherein the feeding assembly further comprises an input member for receiving the continuous strip in an input direction into the cutting device and one or more guide members for guiding the continuous strip from the input member to the feeding member, wherein the input direction is in line with the rotation axis.

2. The cutting device according to claim 1, wherein the input member is placed at, near or in line with the rotation axis.

3. The cutting device according to claim 1, wherein the working plane extends horizontally or wherein the rotation axis extends vertically.

4. The cutting device according to claim 1, wherein the rotation axis intersects with the cutting line.

5. The cutting device according to claim 4, wherein the feeding member is arranged for feeding the continuous strip along a feeding path in the working plane, wherein the feeding path intersects with the cutting line and the rotation axis intersects with the feeding path at the cutting line.

6. The cutting device according to claim 1, wherein the one or more guide members are arranged for directing the continuous strip along a guide path from a first orientation in line with the rotation axis at the input member to a second orientation in line with the feeding direction at the feeding member.

7. The cutting device according to claim 6, wherein the guide path merges tangentially with the input direction at the input member and the feeding direction at the feeding member.

8. The cutting device according to claim 1, wherein the input member is rotatable about the rotation axis together with the feeding member.

9. The cutting device according to claim 8, wherein the input member and the feeding member are operationally connected so as to rotate in unison about the rotation axis.

10. The cutting device according to claim 8, wherein the strip has a substantially flat main surface, wherein the input member is arranged for receiving the strip with its flat main surface parallel to the input direction and perpendicular to the feeding direction.

11. The cutting device according to claim 8, wherein the input member comprises one or more input rollers, wherein each input roller is rotatable about an input roller axis that extends perpendicular to the input direction and the feeding direction.

12. The cutting device according to claim 1, wherein the feeding assembly as a whole is rotatable about the rotation axis with respect to the knife.

13. The cutting device according to claim 1, wherein the feeding member comprises retaining elements for retaining the continuous strip.

14. The cutting device according to claim 13, wherein the retaining elements are vacuum retaining elements or magnetic retaining elements.

15. The cutting device according to claim 13, wherein the feeding member is positionable in a cutting position downstream of the cutting line with respect to the feeding direction for retaining a leading end of the continuous strip in said cutting position with respect to the knife.

16. The cutting device according to claim 15, wherein the feeding member comprises a main body and a tip that projects from the main body towards the cutting line when the feeding member is in the cutting position, wherein the main body extends in or parallel to the feeding direction and the tip deflects from the feeding direction away from the cutting line at a deflection angle.

17. The cutting device according to claim 16, wherein the deflection angle is in a range of twelve to twenty degrees.

18. The cutting device according to claim 16, wherein the feeding member and the knife are rotatable with respect to each other in a cutting angle range, wherein the deflection angle is chosen to be at or near a minimum angle within said cutting angle range.

19. The cutting device according to claim 16, wherein the retaining elements are provided in the main body and the tip.

20. The cutting device according to claim 16, wherein the feeding member is movable back-and-forth across the cutting line between the cutting position and a pick-up position upstream of cutting line with respect to the feeding direction for picking up the leading end of the continuous strip from the one or more guide members at the pick-up position and for pulling said leading end across the cutting line towards the cutting position.

21. The cutting device according to claim 1, wherein the cutting device comprises an output member for outputting the tire components in an output direction parallel to the cutting line.

22. The cutting device according to claim 21, wherein the output member comprises an output surface for supporting the cut tire components in the output direction, wherein the feeding member is arranged for transferring the cut tire components onto the output surface.

23. The cutting device according to claim 1, wherein the one or more guide members are arranged for guiding the continuous strip from the input member to the feeding member in a guide plane defined by the feeding direction and the rotation axis.

24. The cutting device according to claim 23, wherein the one or more guide members comprises one or more guide rollers, wherein each guide roller comprises a guide roller axis extending perpendicular to the guide plane.

25. The cutting device according to claim 24, wherein one or more of the guide rollers are formed as brush rollers, wherein each brush roller comprises a plurality of bristles that form a circumferential brush surface around the guide roller axis for supporting the continuous strip and a side flange extending in the guide plane alongside said circumferential brush surface, wherein the bristles are inclined towards the side flange.

26. The cutting device according to claim 1, wherein a leading end of the continuous strip is held stationary at the cutting line during cutting, wherein the one or more guide members comprises a dancer roller that is movable in a dancing direction for buffering the incoming continuous strip with respect to the leading end of the continuous strip during said cutting.

27. A production line comprising the cutting device according to claim 1, further comprising an upstream station for handling the continuous strip prior to the input of the continuous strip into the cutting device, wherein said upstream station comprises an output member that is arranged for supplying the continuous strip to the input member of the cutting device, wherein the output member of the upstream station is placed above the input member of the cutting device in line with the rotation axis of the cutting device.

28. The production line according to claim 27, wherein the upstream station and the cutting device cooperate for twisting the continuous strip about the rotation axis between the output member of the upstream station and the input member of the cutting device, depending on the cutting angle of the cutting device.

29. The production line according to claim 28, wherein the placement of the upstream station with respect to the cutting device is out of line with the feeding direction of the cutting device.

30. The production line according to claim 27, wherein the upstream station comprises a festooner for buffering a length of the continuous strip, wherein the output member of the upstream station is an output roller of the festooner.

31. The production line according to claim 27, wherein the output member of the upstream station and the input member of the cutting device are spaced apart such that the length of the continuous strip in between is less than three meters.

32. A method for cutting a continuous strip into tire components with the use of the cutting device according to claim 1, wherein the input member is placed in line with the rotation axis, wherein the method comprises the step of inputting the continuous strip into the cutting device at the input member in the input direction in line with the rotation axis.

33. The method according to claim 32, wherein the method further comprises the steps of guiding the continuous strip via the one or more guide members from the input member to a pick-up position below the feeding member and transferring the continuous strip from one of the guide members to the feeding member in said pick-up position, wherein the transfer comprises the steps of retaining the continuous strip to the one guide member while the feeding member is not in contact with the continuous strip, contacting the continuous strip with the feeding member, simultaneously retaining the continuous strip with the feeding member and the one guide member, releasing the continuous strip from the one guide member.

34. The method according to claim 33, wherein the cutting device comprises an output member for outputting the cut tire components in an output direction parallel to the cutting line, wherein the method further comprises the step of pulling the continuous strip with the feeding member in the feeding direction from the pick-up position across the cutting line into a cutting position above the output member while the feeding member retains the continuous strip, cutting the continuous strip into a tire component while the feeding member retains the continuous strip and transferring the cut tire component from the feeding member to the output member, wherein said transfer comprises the steps of retaining the continuous strip to the feeding member while the output member is not in contact with the continuous strip, providing a relative movement between the feeding member and the output member so that the output member contacts the continuous strip, simultaneously retaining the continuous strip with the feeding member and the output member and releasing the continuous strip from the feeding member.

* * * * *